Dec. 12, 1950     B. H. CARROLL     2,533,427

SUPERSENSITIZATION OF MESO-ARYL CARBOCYANINE DYES

Filed July 13, 1949

FIG. 1.
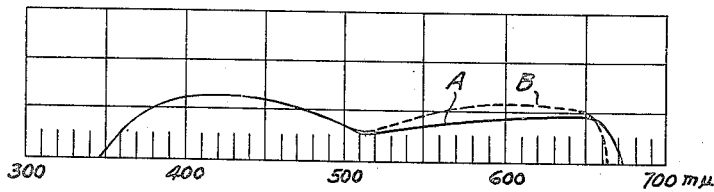

A = 3,3'-dimethyl-9-phenylselenacarbocyanine bromide

B = 3,3'-dimethyl-9-phenylselenacarbocyanine bromide plus 2-[2-(p-anisidino)propenyl] benzothiazole ethiodide FIG. 2.
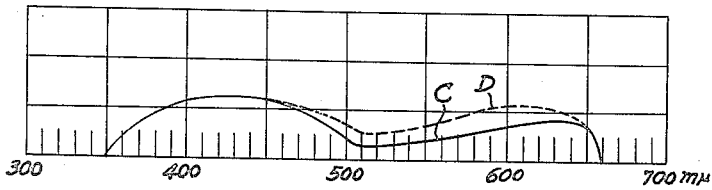

C = 3,3'-dimethyl-9-phenylthiacarbocyanine iodide

D = 3,3'-dimethyl-9-phenylthiacarbocyanine iodide plus 2-β-anilinovinylquinoline ethiodide FIG. 3.
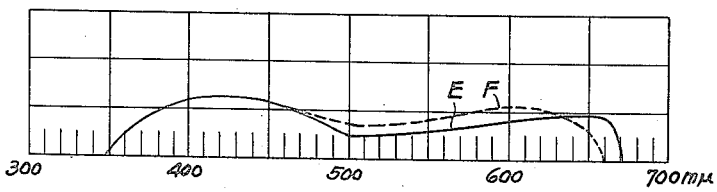

E = 3,3'-dimethyl-9-phenylselenacarbocyanine bromide

F = 3,3'-dimethyl-9-phenylselenacarbocyanine bromide plus 2-β-anilinovinylquinoline ethiodide

BURT H. CARROLL
INVENTOR

BY Daniel I. Mayne
Lawrence H. Willis

ATTORNEY & AGENT

Patented Dec. 12, 1950

2,533,427

UNITED STATES PATENT OFFICE 2,533,427

SUPERSENSITIZATION OF MESO-ARYL CARBOCYANINE DYES

Burt H. Carroll, Rochester, N. Y., assignor to Eastman Kodak Company, Rochester, N. Y., a corporation of New Jersey Application July 13, 1949, Serial No. 104,567

18 Claims. (Cl. 95—7)

This invention relates to photographic emulsions comprising meso-aryl carbocyanine dyes and as supersensitizers therefor, hemicyanine dyes.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

More recently, it has been found that the sensitization produced in an emulsion by certain cyanine dyes, particularly monomethine cyanine dyes, can be increased by incorporating in the sensitized emulsion certain hemicyanine dyes, particularly hemidicarbocyanine dyes (U. S. Patent 2,218,230, dated October 15, 1940). Inasmuch as conditions in the emulsion, i. e., the silver ion and/or the hydrogen ion concentration undergo little or no change in such a method, the phenomenon has been called "supersensitization."

I have now found a new means of altering the sensitivity in emulsions containing certain other cyanine dyes of a particular type. Since the conditions in the emulsion, i. e., the hydrogen ion and/or the silver ion concentration undergo little or no change in my new method, I shall designate my new method as a kind of supersensitization. My new method is not to be confused with the method described in U. S. Patent 2,218,230, wherein cyanine dyes different from those utilized in this invention have their sensitivity altered with hemicyanine dyes, particularly hemidicarbocyanine dyes. Many of the dyes supersensitized according to the method of U. S. Patent 2,218,230 are excellent sensitizers in their own right, whereas many of the dyes supersensitized according to the present invention are relatively poor sensitizers in their own right. It was, therefore, most unexpected to find that the cyanine dyes useful in practicing my invention could advantageously be supersensitized with hemicarbocyanine dyes.

It is, therefore, an object of my invention to provide photographic emulsions comprising certain cyanine dyes and, as supersensitizers therefor, certain hemicarbocyanine dyes. A further object is to provide a process for preparing these supersensitized emulsions. Other objects will become apparent from a consideration of the following description and examples.

The cyanine dyes useful in practicing my invention are the carbocyanine dyes containing an aryl group in the meso, or central, position of the intercyclic chain. Such dyes can advantageously be represented by the following general formula:

I 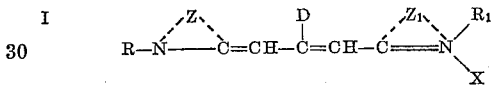

wherein R and $R_1$ each represents an alcohol radical (i. e. an alkyl group, substituted or unsubstituted) e. g., methyl, ethyl, n-propyl, n-butyl, isobutyl, etc. groups, D represents an aryl group, e. g. phenyl, o- and p-chlorophenyl, o-, m-, and p-tolyl, etc. groups, Z and $Z_1$ each represents the non-metallic atoms necessary to complete a heterocyclic nucleus selected from those of the benzothiazole series, those of the β-naphthothiazole series and those of the benzoselenazole series and X represents an anion, such as halide (e. g. bromide, chloride, iodide), methylsulfate ($CH_3SO_4$—), ethylsulfate ($C_2H_5SO_4$—), benzenesulfonate, p-toluenesulfonate, perchlorate, thiocyanate, etc.). The dyes represented by the above formula can advantageously be prepared by methods described in U. S. Patents 1,934,659 (dated November 7, 1933), 2,369,646 (dated February 20, 1945) and 2,369,657 (dated February 20, 1945).

The hemicarbocyanine dyes useful as supersensitizers according to the method of my invention can advantageously be represented by the following general formula:

II
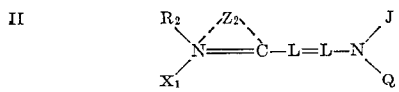

wherein $R_2$ represents an alcohol radical (i. e. an alkyl group, unsubstituted and substituted) e. g. methyl, ethyl, n-butyl, isobutyl, etc. groups, $X_1$ represents an anion such as halide (e. g. bromide, chloride, iodide), methylsulfate $$(CH_3SO_4\text{—})$$

ethylsulfate $(C_2H_5SO_4\text{—})$, benzenesulfonate, p-toluenesulfonate, perchlorate, thiocyanate, etc.), L represents a methenyl group, such as CH or substituted methenyl, (e. g. a —$CR_3$= group, wherein $R_3$ is a methyl or ethyl group), J represents a hydrogen atom or an alkyl group (e. g. methyl, ethyl, etc. groups), Q represents an alkyl group (e. g. methyl, ethyl, etc. groups), an aryl group (e. g. a phenyl group, an alkoxyphenyl group, a β-naphthyl group, etc.) or J and Q together represent the non-metallic atoms necessary to complete a heterocyclic nucleus other than a nucleus of the pyrrol series, and $Z_2$ represents the non-metallic atoms necessary to complete an organic heterocyclic nucleus. These hemicarbocyanine dyes have little (if any) sensitizing effect when used alone as sensitizers for photographic silver halide emulsions. It was, therefore, surprising to find that the combination of such hemicarbocyanine dyes with meso-aryl cyanine dyes, which are themselves relatively weak sensitizers, provided effective means for advantageously altering the sensitivity of photographic silver halide emulsions.

Many of the hemicarbocyanine dyes useful in practicing my invention have previously been described in U. S. Patents 2,166,736, dated July 18, 1939, 2,218,230, dated October 15, 1940, 2,263,-749, dated November 25, 1941, 2,298,732, dated October 13, 1942, and 2,301,361, dated November 10, 1942.

Typical hemicarbocyanine dyes useful in practicing my invention are those selected from the following, for example:

(A′) The 2-[2-(1-piperidyl)vinyl] benzothiazole, benzoxazole, benzoselenazole, β-naphthothiazole and quinoline alkyl quaternary salts, e. g.:

2-[2-(1-piperidyl)vinyl] benzothiazole meth- and ethiodides,
2-[2-(1-piperidyl)vinyl]-β-naphthothiazole meth- and ethiodides,
2-[2-(1-piperidyl)vinyl] quinoline metho- and ethobromides, etc.

(B′) The 2-[2-(1-piperidyl)propenyl] benzothiazole, benzoxazole, benzoselenazole, β-naphthothiazole and quinoline alkyl quaternary salts, e. g.:

2-[2-(1-piperidyl) propenyl] benzothiazole, meth- and ethiodides, etc.

(C′) The 2-[2-(1-piperidyl)-1-butenyl] benzothiazole, benzoxazole, benzoselenazole, β-naphthothiazole and quinoline alkyl quaternary salts, e. g.:

2-[2-(1-piperidyl)-1-butenyl] benzothiazole meth- and ethiodides, etc.

(D′) The 2-[2-(N-arylamino) vinyl] benzothiazole, benzoxazole, benzoselenazole, β-naphthothiazole and quinoline alkyl quaternary salts, e. g.:

2-(β-anilino) vinylbenzothiazole meth- and ethiodides,
2-(β-anilino) vinylbenzoxazole meth- and ethiodides, etc.

(E′) The 2-[2-(N-arylamino) propenyl] benzothiazole, benzoxazole, benzoselenazole, β-naphthothiazole and quinoline alkyl quaternary salts, e. g.:

2-[2-(p-chloranilino) propenyl] benzothiazole meth- and ethiodides,
2-(2-anilino) propenyl-β-naphthothiazole meth- and ethiodides, etc.

(F′) The 2-[2-(N-arylamino)-1-butenyl] benzothiazole, benzoxazole, benzoselenazole, β-naphthothiazole and quinoline alkyl quaternary salts, e. g.:

2-[2-(p-anisidino)-1-butenyl] benzothiazole meth- and ethiodides,
2-(2-anilino)-1-butenylquinoline meth- and ethiodides, etc.

(G′) The 2-(2-dialkylaminovinyl) benzothiazole, benzoxazole, benzoselenazole, β-naphthothiazole and quinoline alkyl quaternary salts, e. g.:

2-(β-dimethylaminovinyl) benzothiazole metho- and etho-p-toluenesulfonates,
2-(β-diethylaminovinyl) benzoselenazole meth- and ethiodides, etc.

(H′) The 2-(2-dialkylaminopropenyl) benzothiazole, benzoxazole, benzoselenazole, β-naphthothiazole and quinoline alkyl quaternary salts, e. g.:

2-(2-dimethylaminopropenyl) benzothiazole metho- and ethobromides,
2-(2-dimethylaminopropenyl) benzoxazole meth- and ethiodides, etc.

(I′) The 2-[2-(dialkylamino)-1-butenyl] benzothiazole, benzoxazole, benzoselenazole, β-naphthothiazole and quinoline alkyl quaternary salts, e. g.:

2-[2-(dimethylamino)-1-butenyl] benzothiazole meth- and ethiodides, etc.

(J′) The 2-[2-(4-morpholinyl) vinyl] benzothiazole, benzoxazole, benzoselenazole, β-naphthothiazole and quinoline alkyl quaternary salts, e. g.:

2-[β-(4-morpholinyl) vinyl] benzothiazole meth- and ethiodides,
2-[β-(4-morpholinyl) vinyl] benzoselenazole metho- and ethobromides, etc.

(K′) The 2-[2-(4-morpholinyl) propenyl] benzothiazole, benzoxazole, benzoselenazole, β- naphthothiazole and quinoline alkyl quaternary salts, e. g.:

2-[2-(4-morpholinyl) propenyl] benzothiazole meth- and ethiodides,
2-[2-(4-morpholinyl) propenyl] benzoxazole meth- and ethiodides, etc.

(L') The 2-[2-(4-morpholinyl)-1-butenyl] benzothiazole, benzoxazole, benzoselenazole, β-naphthothiazole and quinoline alkyl quaternary salts, e. g.:

2-[2-(4-morpholinyl)-1-butenyl] benzothiazole meth- and ethiodides, etc.

(M') The 2-[2-(N-alkyl-N-arylamino) vinyl] benzothiazole, benzoxazole, benzoselenazole, β-naphthothiazole and quinoline alkyl quaternary salts, e. g.:

2-[β-(N-methylanilino) vinyl] benzothiazole meth- and ethiodides, etc.

According to my invention, I incorporate one or more of the cyanine dyes selected from those represented by Formula I above with one or more of the hemicarbocyanine selected from those represented by Formula II above in a photographic emulsion. My invention is particularly directed to the ordinarily employed gelatino-silver-halide emulsions. However, my supersensitizing combination can be employed in silver halide emulsions in which the carrier is other than gelatin, e. g. a resinous substance or cellulosic material which has substantially no deleterious effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the meso aryl carbocyanine dyes which I employ in practicing my invention, is of the order of 0.05 to 0.25 g. per mole of silver halide in the emulsion.

The hemicarbocyanine dyes utilized in my invention are advantageously employed at concentrations on the order of 0.05 to 0.25 g. per mole of silver halide in the emulsion.

Generally speaking, the ratio of concentration of a hemicarbocyanine dye (Formula II) to carbocyanine dye (Formula I) can vary rather widely in my new combinations, e. g. from 5:1 to 1:5 (by weight) in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes which I employ. The dyes are advantageously incorporated in the finished, washed emulsions and should be uniformly distributed throughout the emulsions. The following procedure is satisfactory: Stock solutions of the sensitizing dyes desired are prepared by dissolving the dyes in methyl or ethyl alcohol. Then, to one liter of a flowable gelatino-silver-halide emulsion, the desired amounts of the stock solution of one of the dyes (diluted somewhat with water, if desired) is slowly added, while stirring the emulsion. Stirring is continued until the dye is thoroughly incorporated in the emulsion. Then the desired amount of the stock solution of the second dye (diluted somewhat with water, if desired) is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following examples will serve to illustrate further the manner of practicing my invention. To different portions of the same batch of photographic gelatino-silverbromiodide emulsion were added (1) a carbocyanine dye selected from those represented by Formula I above and (2) a combination of the carbocyanine dye and a hemicarbocyanine dye selected from those represented by Formula II above. The different portions of emulsion were then coated on glass supports and exposed in the usual manner in a spectrograph and in a sensitometer to white light and through filters, including a Wratten No. 25 filter, i. e. a filter which transmits substantially no light of wavelength shorter than 580 mu. Following are several examples of such emulsion together with the speed (clear or white light and red), gamma and fog obtained.

The heterocyclic nuclei of the dyes selected from those represented by Formulas I and II

| Example | Dye (g. per mole of silver halide in emulsion) | White Light Exposure | | | Red Light Exposure | | |
|---|---|---|---|---|---|---|---|
| | | Speed | Gamma | Fog | Speed | Gamma | Fog |
| 1 | (a) 3,3'-dimethyl-9-phenyl-4,5,4',5'-dibenzothiacarbocyanine bromide (0.077) | 34.0 | 5.10 | .08 | 16.2 | 5.60 | .08 |
| | (b) dye (a) (0.077) with 2-(2-anilino-1-butenyl)-β-naphthothiazole methiodide (0.077). | 66.0 | 5.30 | .09 | 46.0 | 5.55 | .09 |
| 2 | (c) dye (a) (0.077) | 34.0 | 5.10 | .08 | 16.2 | 5.60 | .08 |
| | (d) dye (a) (0.077) with 2-[2-(p-chloroanilino-1-butenyl]-β-naphthothiazole methiodide (0.077). | 98.0 | 4.70 | .10 | 65.0 | 5.65 | .10 |
| 3 | (e) dye (a) (0.078) | 1380 | 1.23 | .10 | 165 | 1.25 | .10 |
| | (f) dye (a) (0.078) with 2-[2-(p-chloroanilino)-1-butenyl]-β-naphthothiazole methiodide (0.078). | 1260 | 1.45 | .10 | 300 | 1.55 | .10 |
| 4 | (g) 3,3'-dimethyl-9-phenylselenacarbocyanine bromide (0.086) | 42.0 | 3.77 | .05 | 4.80 | 3.93 | .05 |
| | (h) dye (g) (0.086) with 2-β-anilinovinylquinoline ethiodide (0.086) | 61.0 | 3.44 | .04 | 8.80 | 3.72 | .04 |
| 5 | (i) dye (a) (0.078) | 1380 | 1.23 | .10 | 165 | 1.25 | .10 |
| | (j) dye (a) (0.078) with 2-[2-(p-chloroanilino)propenyl] benzothiazole ethiodide (0.078). | 1350 | 1.33 | .10 | 230 | 1.27 | .10 |
| 6 | (k) dye (a) (0.078) | 1380 | 1.23 | .10 | 165 | 1.25 | .10 |
| | (l) dye (a) (0.078) with 2-(p-anisidinovinyl)-5-chlorobenzothiazole etho-p-toluene-sulfonate (0.078). | 1080 | 1.20 | .14 | 255 | 1.05 | .14 |
| 7 | (m) dye (g) (0.086) | 42.0 | 3.77 | .05 | 4.80 | 3.93 | .05 |
| | (n) dye (g) (0.086) with 2-[2-(p-anisidino)propenyl] benzothiazole ethiodide (0.086). | 46.0 | 3.42 | .05 | 5.50 | 3.43 | .05 |
| 8 | (o) dye (a) (0.078) | 1380 | 1.23 | .10 | 165 | 1.25 | .10 |
| | (p) dye (a) (0.078) with 2-[2-(1-piperidyl)vinyl] benzothiazole ethiodide (0.078). | 1380 | 1.54 | .10 | 220 | 1.62 | .10 |
| 9 | (q) dye (a) (0.078) | 1380 | 1.23 | .10 | 165 | 1.25 | .10 |
| | (r) dye (a) (0.078) with 2-[2-(1-piperidyl)vinyl] quinoline ethiodide (0.078) | 1900 | 1.18 | .10 | 225 | 1.39 | .10 |
| 10 | (s) dye (a) (0.078) | 1380 | 1.23 | .10 | 165 | 1.25 | .10 |
| | (t) dye (a) (0.078) with 2-[2-(1-piperidyl)vinyl] benzoxazole ethiodide (0.078). | 1750 | 1.28 | .10 | 185 | 1.43 | .10 |
| 11 | (u) 3,3'-dimethyl-9-phenylthiacarbocyanine iodide (0.086) | 46.0 | 3.46 | .05 | 4.80 | 3.49 | .05 |
| | (v) dye (u) (0.086) with 2-β-anilinovinylquinoline ethiodide (0.086) | 50.0 | 3.78 | .05 | 6.80 | 3.51 | .05 |
| 12 | (w) dye (a) (0.078) | 1380 | 1.23 | .10 | 165 | 1.25 | .10 |
| | (x) dye (a) (0.078) with 2-[2-(p-chloroanilino)-1-butenyl] benzoselenazole ethiodide (0.078). | 1230 | 1.40 | .08 | 205 | 1.47 | .08 |
| 13 | (y) 9-p-chlorophenyl-3,3'-dimethyl-4,5,4',5'-dibenzothiacarbocyanine bromide (0.077). | 23.5 | 4.25 | .05 | 7.10 | 6.60 | 0.5 |
| | (z) dye (y) (0.077) with 2-(2-anilino-1-butenyl)-β-naphthothiazole methiodide (0.077). | 44.0 | 4.60 | .10 | 28.0 | 4.75 | .10 |
| 14 | (a') dye (u) (0.078) | 100 | 2.92 | .05 | 12.3 | 3.30 | .05 |
| | (b') dye (u) (0.078) with 2-[2-(p-chloroanilino)-1-butenyl]-β-naphthothiazole methiodide (0.078). | 110 | 2.86 | .04 | 21.5 | 3.32 | .01 |

In the manner described above still many other supersensitizing combinations of one or more of the meso-aryl carbocyanine dyes selected from those represented by Formula I above with one or more of the hemicarbocyanine dyes selected from those represented by Formula II above can be prepared.

The meso-aryl carbocyanine dyes useful in practicing my invention are well known in the art. Especially useful are the:

(A) 9-aryl-3,3'-dialkyl-4,5,4',5'-dibenzothiacarbocyanine salts, e. g.:

3,3'-dimethyl-9-phenyl-4,5,4',5'-dibenzothiacarbocyanine bromide.

(B) 9-aryl-3,3'-dialkylthiacarbocyanine salts, e. g.:

3,3'-diethyl-9-phenylthiacarbocyanine bromide.

(C) 9-aryl-3,3'-dialkylselenacarbocyanine salts, e. g.:

3,3'-dimethyl-9-phenylselenacarbocyanine bromide.

(D) 9-aryl-3,3'-dialkyl-4,5-benzothiathiacarbocyanine salts, e. g.:

3,3'-dimethyl-9-phenyl-4,5-benzothiathiacarbocyanine bromide.

(E) 9-aryl-3,3'-dialkyl-4,5-benzothiaselenacarbocyanine salts, e. g.:

3,3'-dimethyl-9-phenyl-4,5-benzothiaselenacarbocybocyanine bromide.

(F) 9-aryl-3,3'-dialkylthiaselenacarbocyanine salts, e. g.:

3,3'-dimethyl-9-phenylthiaselenacarbocyanine bromide.

above, and the aryl nucleus represented by "D" above can be substituted by simple substituents which do not interfere with sensitizing properties, e. g. alkyl (e. g. methyl, ethyl, etc.), alkoxyl (e. g. methoxyl, ethoxyl, etc.) or chloro groups.

The accompanying drawing illustrates the supersensitizing effect obtained with three of my new combinations in silver bromiodide emulsions. Each figure of the drawing is a diagrammatic reproduction of two spectrograms. In each figure the sensitivity of the emulsion containing only the meso-aryl carbocyanine dye is represented by the lower curve. The upper curve represents the sensitivity conferred on the emulsion by the combination of the meso-aryl carbocyanine dye and the hemicarbocyanine dye. No curve showing the sensitivity conferred on the emulsion by the hemicarbocyanine dye alone is shown, since the sensitivity conferred by the hemicarbocyanine dye in question is too weak to be significant in the comparisons shown.

In Figure 1, curve A represents the sensitivity of an ordinary gelatino-silver-bromiodide emulsion sensitized with 3,3'-dimethyl-9-phenylselenacarbocyanine bromide, and curve B represents the sensitivity of the same emulsion containing 3,3'-dimethyl-9-phenylselenacarbocyanine bromide and 2-[2-(p-anisidino) propenyl] benzothiazole ethiodide. The sensitometric measurements for these emulsions are given in Example 7 of the above table.

In Figure 2, curve C represents the sensitivity of an ordinary gelatino-silver-bromiodide emulsion sensitized with 3,3'-dimethyl-9-phenylthiacarbocyanine iodide, and curve D represents the sensitivity of the same emulsion containing 3,3'-dimethyl-9-phenylthiacarbocyanine iodide and 2-β-anilinovinylquinoline ethiodide. The sensitometric measurements for these emulsions are given in Example 11 of the above table.

In Figure 3, curve E represents the sensitivity of an ordinary gelatino-silver-bromiodide emulsion sensitized with 3,3'-dimethyl-9-phenylselenacarbocyanine bromide, and curve F represents the sensitivity of the same emulsion containing 3,3' - dimethyl-9-phenylselenacarbocyanine bromide and 2-β-anilinovinylquinoline ethiodide. The sensitometric measurements for these emulsions are given in Example 4 of the above table.

My invention is primarily directed to the ordinarily employed gelatino-silver-halide developing-out emulsions, e. g. gelatino-silver-chloride, -chlorobromide, -chloriodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsion set forth in U. S. Patent 2,456,956, dated December 21, 1948, can also be employed in practicing my invention.

The emulsions prepared in accordance with my invention can be coated in the usual manner on any suitable support, e. g. glass, cellulose nitrate film, cellulose acetate film, polyvinyl acetal resin film, paper or metal.

What I claim as my invention and desire secured by Letters Patent of the United States is:

1. A photographic silver halide emulsion sensitized with a supersensitizing combination of at least one meso-aryl carbocyanine dye selected from those represented by the following general formula:

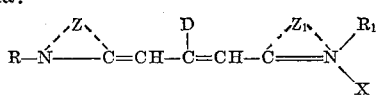

wherein R and $R_1$ each represents an alkyl group of the formula $C_nH_{2n+1}$ wherein $n$ represents a positive integer from 1 to 4, D represents a monocyclic aryl nucleus of the benzene series, X represents an acid radical, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

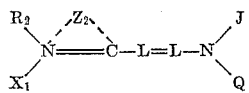

wherein $R_2$ represents an alkyl group of the formula $C_nH_{2n+1}$ wherein $n$ represents a positive integer of from 1 to 4, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

2. A photographic gelatino-silver-halide developing-out emulsion sensitized with a supersensitizing combination of at least one meso-aryl carbocyanine dye selected from those represented by the following general formula:

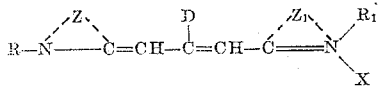

wherein R and $R_1$ each represents an alkyl group of the formula $C_nH_{2n+1}$ wherein $n$ represents a positive integer from 1 to 4, D represents a monocyclic aryl nucleus of the benzene series, X represents an acid radical, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

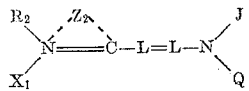

wherein $R_2$ represents an alkyl group of the formula $C_nH_{2n+1}$ wherein $n$ represents a positive integer of from 1 to 4, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

3. A photographic gelatino-silver-bromiodide developing-out emulsion sensitized with a supersensitizing combination of at least one meso-aryl carbocyanine dye selected from those represented by the following general formula:

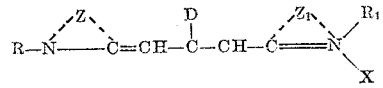

wherein R and $R_1$ each represents an alkyl group of the formula $C_nH_{2n+1}$ wherein $n$ represents a positive integer from 1 to 4, D represents a monocyclic aryl nucleus of the benzene series, X represents an acid radical, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

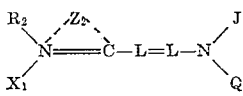

wherein $R_2$ represents an alkyl group of the formula $C_nH_{2n+1}$ wherein $n$ represents a positive integer of from 1 to 4, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

4. A photographic gelatino-silver-halide developing-out emulsion sensitized with a supersensitizing combination of at least one meso-aryl carbocyanine dye selected from those represented by the following general formula:

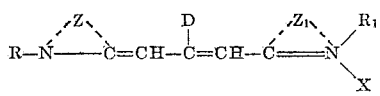

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

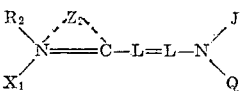

wherein $R_2$ represents an alkyl group of the formula $C_nH_{2n+1}$ wherein $n$ represents a positive integer of from 1 to 2, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

5. A photographic gelatino-silver-halide developing-out emulsion sensitized with a supersensitizing combination of at least one meso-aryl carbocyanine dye selected from those represented by the following general formula:

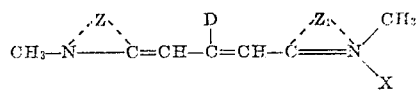

wherein X represents a halogen atom having an atomic weight of from 35 to 127, D represents a mononuclear aryl group of the benzene series, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

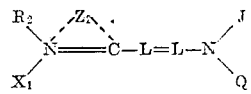

wherein $R_2$ represents an alkyl group of the formula $C_nH_{2n+1}$ wherein $n$ represents a positive integer of from 1 to 2, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

6. A photographic gelatino-silver-halide developing-out emulsion sensitized with a supersensitizing combination of at least one meso-aryl carbocyanine dye selected from those represented by the following general formula:

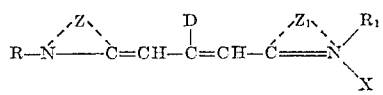

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the benzothiazole series, and at least one hemicarbocyanine dye selected from those represented by the following general formula:

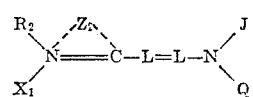

wherein $R_2$ represents an alkyl group of the formula $C_nH_{2n+1}$ wherein $n$ represents a positive integer of from 1 to 2, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

7. A photographic gelatino-silver-halide developing-out emulsion sensitized with a supersensitizing combination of at least one meso-aryl carbocyanine dye selected from those represented by the following general formula:

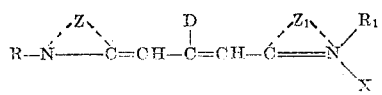

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the β-naphthothiazole series, and at least one hemicarbocyanine dye selected from those represented by the following general formula:

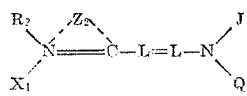

wherein $R_2$ represents an alkyl group of the formula $C_nH_{2n+1}$ wherein $n$ represents a positive integer of from 1 to 2, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

8. A photographic gelatino-silver-halide developing-out emulsion sensitized with a supersensitizing combination of at least one meso-aryl carbocyanine dye selected from those represented by the following general formula:

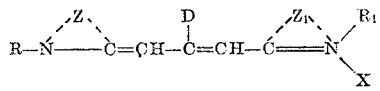

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the benzoselenazole series, and at least one hemicarbocyanine dye selected from those represented by the following general formula:

wherein $R_2$ represents an alkyl group of the formula $C_nH_{2n+1}$ wherein $n$ represents a positive integer of from 1 to 2, L represents a methenyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

9. A photographic gelatino-silver-halide developing-out emulsion sensitized with a supersensitizing combination of at least one meso-aryl carbocyanine dye selected from those represented by the following general formula:

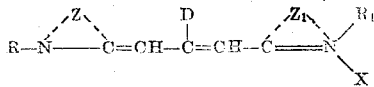

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus selected from those of the benzothiazole series, those of the β-naphthothiazole series and those of the benzoselenazole series, and at least one hemicarbocyanine dye selected from those represented by the following general formula:

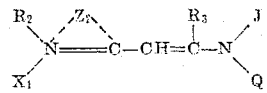

wherein $R_2$ represents an alkyl group of the formula $C_nH_{2n+1}$ wherein $n$ is a positive integer of from 1 to 2, $R_3$ represents a member selected from the group consisting of a hydrogen atom, a methyl group and an ethyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the nonmetallic atoms necessary to complete an organic basic nucleus selected from the group consisting of those of the piperidyl series and those of the morpholinyl series.

10. A photographic gelatino-silver-halide developing-out emulsion sensitized with a supersensitizing combination of at least one meso-aryl carbocyanine dye selected from those represented by the following general formula:

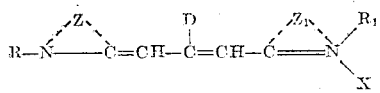

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the benzothiazole series, and at least one hemicarbocyanine dye selected from those represented by the following general formula:

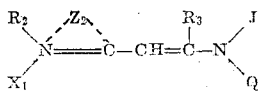

wherein $R_2$ represents an alkyl group of the formula $C_nH_{2n+1}$ wherein $n$ is a positive integer of from 1 to 2, $R_3$ represents a member selected from the group consisting of a hydrogen atom, a methyl group and an ethyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

11. A photographic gelatino-silver-halide developing-out emulsion sensitized with a supersensitizing combination of at least one meso-aryl carbocyanine dye selected from those represented by the following general formula:

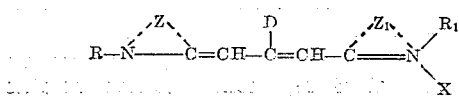

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the β-naphthothiazole series, and at least one hemicarbocyanine dye selected from those represented by the following general formula:

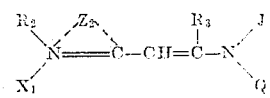

wherein $R_2$ represents an alkyl group of the formula $C_nH_{2n+1}$ wherein $n$ is a positive integer of from 1 to 2, $R_3$ represents a member selected from the group consisting of a hydrogen atom, a methyl group and an ethyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 and 2, and a monocyclic aryl group of the benzene series, and J and Q together represent the non-metallic atoms necessary to complete an organic basic nucleus selected from the group consisting of those of the piperidyl series and those of the morpholinyl series.

12. A photographic gelatino-silver-halide developing-out emulsion sensitized with a supersensitizing combination of at least one meso-aryl carbocyanine dye selected from those represented by the following general formula:

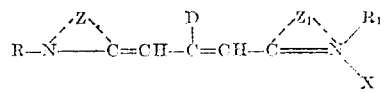

wherein R and $R_1$ each represents an alkyl group of the formula $C_nH_{2n+1}$ wherein $n$ represents a positive integer from 1 to 2, D represents a monocyclic aryl nucleus of the benzene series, X represents an acid radical, and Z and $Z_1$ each represents the non-metallic atoms necessary to complete a heterocyclic nucleus of the benzoselenazole, and at least one hemicarbocyanine dye selected from those represented by the following general formula:

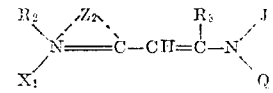

wherein $R_2$ represents an alkyl group of the formula $C_nH_{2n+1}$ wherein $n$ is a positive integer of from 1 to 2, $R_3$ represents a member selected from the group consisting of a hydrogen atom, a methyl group and an ethyl group, $X_1$ represents an acid radical, $Z_2$ represents the non-metallic atoms necessary to complete an organic heterocyclic nucleus selected from those of the benzothiazole series, those of the benzoxazole series, those of the benzoselenazole series, those of the β-naphthothiazole series and those of the quinoline series, J represents a member selected from the group consisting of a hydrogen atom and an alkyl group of the formula $C_dH_{2d+1}$ wherein $d$ represents a positive integer from 1 to 2, Q represents a member selected from the group consisting of an alkyl group of the formula $C_dH_{2d+1}$ wherein $d$ represents a positive integer from 1 to 2, and a monocyclic aryl group of the benzene series, and J and Q together represent the non-metallic atoms necessary to complete an organic basic nucleus selected from the group consisting of those of the piperidyl series and those of the morpholinyl series.

13. A photographic gelatino-silver-halide developing-out emulsion sensitized with a supersensitizing combination of a 3,3-dimethyl-9-phenylselenacarbocyanine salt and a 2-[2-(p-anisidino)propenyl]benzothiazole ethyl salt.

14. A photographic gelatino-silver-halide developing-out emulsion sensitized with 3,3-dimethyl-9-phenylselenacarbocyanine bromide and 2-[2-(p-anisidino)propenyl]benzothiaole ethiodide.

15. A photographic gelatino-silver-halide developing-out emulsion sensitized with a supersensitizing combination of a 3-3'-dimethyl-9-phenyl-4,5,4',5'-dibenzothiacarbocyanine salt and a 2-(2-anilino-1-butenyl)-β-naphthothiazole methyl salt.

16. A photographic gelatino-silver-halide developing-out emulsion sensitized with a supersensitizing combination of 3,3'-dimethyl-9-phenyl-4,5,4',5'-dibenzothiacarbocyanine bromide and 2-(2-anilino-1-butenyl)-β-napthothiazole methiodide.

17. A photographic gelatino-silver-halide developing-out emulsion sensitized with a supersensitizing combination of a 3,3'-dimethyl-9-phenylthiacarbocyanine salt and a 2-[2-(p-chloroanilino)-1-butenyl]-β-naphthothiazole methyl salt.

18. A photographic gelatino-silver-halide developing-out emulsion sensitized with a supersensitizing combination of 3,3'-dimethyl-9-phenylthiacarbocyanine iodide and 2-[2-(p-chloroanilino)-1-butenyl]-β-naphthothiazole methiodide.

BURT H. CARROLL.

No references cited.

Certificate of Correction

Patent No. 2,533,427                                                                December 12, 1950

BURT H. CARROLL

It is hereby certified that error appears in the printed specification of the above numbered patent requiring correction as follows:

Columns 7 and 8, opposite example 13, under the heading "Red Light Exposure", subheading "Fog", for "0.5" read *.05*; column 7, lines 69 and 70, for "benzothiaselenacarbocybocyanine" read *benzothiaselenacarbocyanine*; column 10, lines 62 to 64, for that portion of the formula reading

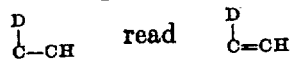

column 17, line 18, for "3,3-" read *3,3'-*; line 20, for "benzothiaole" read *benzothiazole*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*